(12) United States Patent
Sadek et al.

(10) Patent No.: US 11,307,309 B2
(45) Date of Patent: Apr. 19, 2022

(54) MOBILE LIDAR PLATFORMS FOR VEHICLE TRACKING

(71) Applicant: COM-IoT Technologies, Dubai (AE)

(72) Inventors: Mohamed Sadek, Dubai (AE); Omar Barakat, Dubai (AE); Mahmoud Zidan, Dubai (AE); Loay Amin, Dubai (AE)

(73) Assignee: COM-IoT Technologies, Dubai (AE)

( * ) Notice: Subject to any disclaimer, the term of this patent is extended or adjusted under 35 U.S.C. 154(b) by 0 days.

(21) Appl. No.: 16/938,350

(22) Filed: Jul. 24, 2020

(65) Prior Publication Data

US 2021/0011164 A1 Jan. 14, 2021

Related U.S. Application Data

(63) Continuation-in-part of application No. 16/220,908, filed on Dec. 14, 2018, now Pat. No. 10,769,461.

(60) Provisional application No. 62/878,290, filed on Jul. 24, 2019, provisional application No. 62/598,799, filed on Dec. 14, 2017.

(51) Int. Cl.
*G01S 17/89* (2020.01)
*G01S 17/50* (2006.01)
*G06T 7/70* (2017.01)

(52) U.S. Cl.
CPC ............ *G01S 17/89* (2013.01); *G01S 17/50* (2013.01); *G06T 7/70* (2017.01); *G06T 2207/10028* (2013.01); *G06T 2207/20084* (2013.01); *G06T 2210/12* (2013.01)

(58) Field of Classification Search
CPC ................ G01S 17/931; G06T 7/70
USPC ...................................................... 340/576
See application file for complete search history.

(56) References Cited

U.S. PATENT DOCUMENTS

| | | | |
|---|---|---|---|
| 2012/0081542 A1* | 4/2012 | Suk | G06K 9/00805 348/139 |
| 2019/0180467 A1* | 6/2019 | Li | G01S 17/931 |
| 2019/0385457 A1* | 12/2019 | Kim | G08G 1/166 |
| 2021/0103289 A1* | 4/2021 | Templeton | G05D 1/0231 |
| 2021/0146932 A1* | 5/2021 | Smith | G01S 17/42 |

* cited by examiner

*Primary Examiner* — Fabricio R Murillo Garcia
(74) *Attorney, Agent, or Firm* — Erik A. Huestis; Stephen J. Kenny; Foley Hoag LLP

(57) ABSTRACT

Mobile LiDAR platforms for vehicle tracking are provided. In various embodiments, a time-series of point clouds is received from a LiDAR sensor. Each point cloud of the time series of point clouds is projected onto a plane. The projected point clouds are provided to a convolutional neural network. At least one bounding box of a vehicle within each of the projected point clouds is received from the convolutional neural network. A relative speed of the vehicle is determined from the bounding boxes with the projected point clouds. A reference speed of the LiDAR sensor is determined from the GPS receiver. From the relative speed and the reference speed, an absolute speed of the vehicle is determined.

4 Claims, 3 Drawing Sheets

MOBILE LIDAR PLATFORMS FOR VEHICLE TRACKING

CROSS-REFERENCE TO RELATED APPLICATIONS

This application claims the benefit of U.S. Provisional Application No. 62/878,290, filed Jul. 24, 2019 and is a continuation in part of U.S. application Ser. No. 16/220,908, filed Dec. 14, 2018, which claims the benefit of U.S. Provisional Application No. 62/598,799, filed Dec. 14, 2017, all of which prior applications are hereby incorporated by reference in their entirety.

BACKGROUND

Embodiments of the present disclosure relate to speed enforcement, and more specifically, to mobile LiDAR platforms for vehicle tracking.

BRIEF SUMMARY

According to embodiments of the present disclosure, methods of and computer program products for vehicle tracking are provided. In various embodiments, a time-series of point clouds is received from a LiDAR sensor. Each point cloud of the time series of point clouds is a projected onto a plane. The projected point clouds are provided to a convolutional neural network. At least one bounding box of a vehicle within each of the projected point clouds is received from the convolutional neural network. A relative speed of the vehicle is determined from the bounding boxes with the projected point clouds. A reference speed of the LiDAR sensor is determined from the GPS receiver. From the relative speed and the reference speed, an absolute speed of the vehicle is determined.

DETAILED DESCRIPTION

Excessive motor vehicle speed is implicated in approximately one third of all motor vehicle fatalities. Speeding endangers not only the life and health of the vehicle operator, but also their passengers and other people on the road around them, including law enforcement officers.

There is a need for improved tools for speed limit policing and enforcement. Accordingly, the present disclosure provides a mobile platform for vehicle and speed tracking. In various embodiments, the mobile platform is mounted on a police vehicle, and is adapted to dynamically measure the speeds of surrounding vehicles while in motion.

In various embodiments, a LiDAR sensor is mounted on the exterior of the vehicle. Machine Learning and Deep Learning based algorithms are used to detect, classify, and track vehicles such as cars, trucks, and busses. The trained models measure the relative velocity of the surrounding vehicles. The speed of the detector vehicle may be determined via GPS or other motion sensors known in the art. Based on the direction and relative speed of a surrounding vehicle and the absolute speed of the detector vehicle, the absolute speed of the surrounding vehicle may be computed.

For example, where a patrol vehicle (that includes the detector) is moving at 100 km/hr, and a neighboring car is moving directly away from the patrol vehicle at a relative velocity of +20 km/hr, the neighboring car speed may be determined to be 120 km/hr. In this example, a relative velocity of −20 km/hr would result in an absolute speed of 80 km/hr. It will be appreciated that the absolute velocity of a neighboring car that is moving at an angle relative to the patrol vehicle may be computed by figuring in the relative angles of motion.

In addition to determining absolute speed, tailgating can also be detected by the mobile platform. As set out above, various embodiments enable measuring the speed of surrounding vehicles from a moving patrol car, allowing detection of vehicles moving over the speed limit. The speed limit can be dynamically set according to the location of the patrol, for example by reference to the GPS location of the vehicle or by reference to a manually set location. Based on the vehicle location and speed information, tailgating cars can also be detected.

Figure 1:
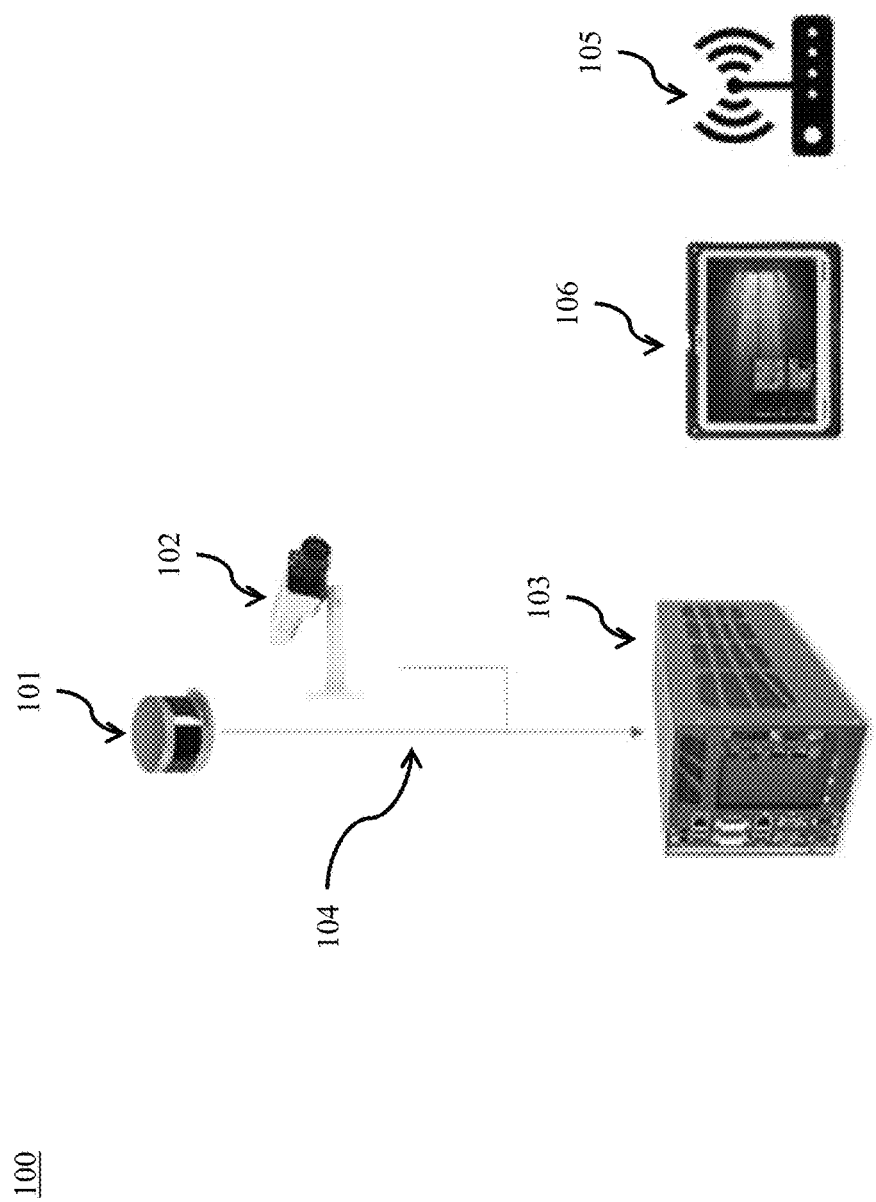
FIG. 1 illustrates a system for vehicle tracking according to embodiments of the present disclosure.

With reference now to FIG. 1, a system for vehicle tracking is illustrated according to embodiments of the present disclosure. System 100 includes a LiDAR sensor 101 or an array of LiDAR sensors. In exemplary embodiments the LiDAR sensor comprises a VLP-16 sensor by Velodyne. This exemplary sensor has a range of about 100 m and emits laser light at about 905 nm. System 100 includes camera 102. In some embodiments, camera 102 has a resolution of about 5 megapixels or higher. In some embodiments, camera 102 is a low light camera. IN some embodiments, camera 102 comprises one or more infrared illuminator to illuminate a target scene or object.

System 100 includes computing node 103. LiDAR sensor 101 and camera 102 are operatively coupled to computing node 103, for example via a wired or wireless network 104. System 100 includes a modem 105 for sending data to remote computing nodes for further processing or action as set out herein. In exemplary embodiments, modem 105 comprises a 4G cellular modem. However, it will be appreciated that a variety of alternative modems or transceivers are suitable for use as set out herein, such as a satellite radio transceiver, a 3G cellular modem, or a 5G cellular modem.

System 100 includes display 106, operatively coupled to computing node 103 and adapted to provide local output to a user. In some embodiments, display 106 is located on a dashboard of a vehicle.

In various embodiments, system 100 is integrated into a mobile platform, such as a car. However, it will be appreciated that system 100 is suitable for use in a variety of vehicles, as well as in a stationary platform.

As set out above, in various embodiments, the system comprises the following hardware components: one or more LiDAR sensor mounted on top of a patrol car; cameras covering a 360 degree view mounted on top of the patrol car; a computing node with sufficient GPU and/or CPU power to analyze the incoming LiDAR and video data in real time.

In various embodiments, the LiDAR sensor outputs a point cloud at regular time intervals. The computing node uses Machine Learning and Deep Learning based algorithms to detect, classify, and track cars, trucks and buses. As described above, this enables relative speed measurement of surrounding vehicles. Tailgating detection takes into account the distance between each pair of surrounding cars and their relative speed.

In various embodiments, the 3D LiDAR point cloud is preprocessed and projected into a top-view (2D). This is provided to a deep convolutional neural network detection model. The model outputs bounding boxes for the vehicles being detected. These bounding boxes are provided to an object tracker that maintains a unique ID for each detected vehicle. In particular, the object tracker maintains the object ID over multiple sequential frames collected by the LiDAR sensor, allowing for object persistence. Average relative velocity is measured for each tracked vehicle by measuring its relative displacement over time. This relative velocity is then converted to absolute velocity by considering the patrol speed.

In some embodiments, the system checks if any of the tracked vehicles is tailgating. Various rules may be applied to define tailgating, including the three-second headway-time rule. The three-second headway rule requires that safe distance is given as: Safe Distance=Speed in meters per second*(3+driving difficulty factors).

When a violating vehicle is detected (e.g., a vehicle exceeding the speed limit or tailgating another vehicle), the vehicle location in the LiDAR point cloud may be projected on onto a corresponding camera-image frame. In various embodiments, LiDAR-camera sensor fusion is employed, which includes calibrating the LiDAR to the camera once after setting the LiDAR and cameras on top of the patrol car. In this way, the violating car image is captured for license plate identification and fine issuing procedures.

Although various embodiments herein use a deep convolutional neural network, it will be appreciated that alternative artificial neural networks may be substituted for the CNN according in embodiments according to the present disclosure. Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

In an exemplary embodiments, a convolutional neural network is applied, having 18 layers. As noted above, the point cloud is projected onto the horizontal plane. In some embodiments, the point cloud is downsampled, for example to 0.1 meters, prior to input to the CNN. In various embodiments, the CNN is configured to output a vehicle type (e.g., car, truck, or bus) as well as a bounding box for each vehicle detected.

As described above, a tracker assigns the new CNN bounding boxes output at time t with the ones at time t−1 by measuring the intersection these boxes make with the former ones taking into consideration the displacement and dimensions of these vehicles bounding boxes.

Figure 2:
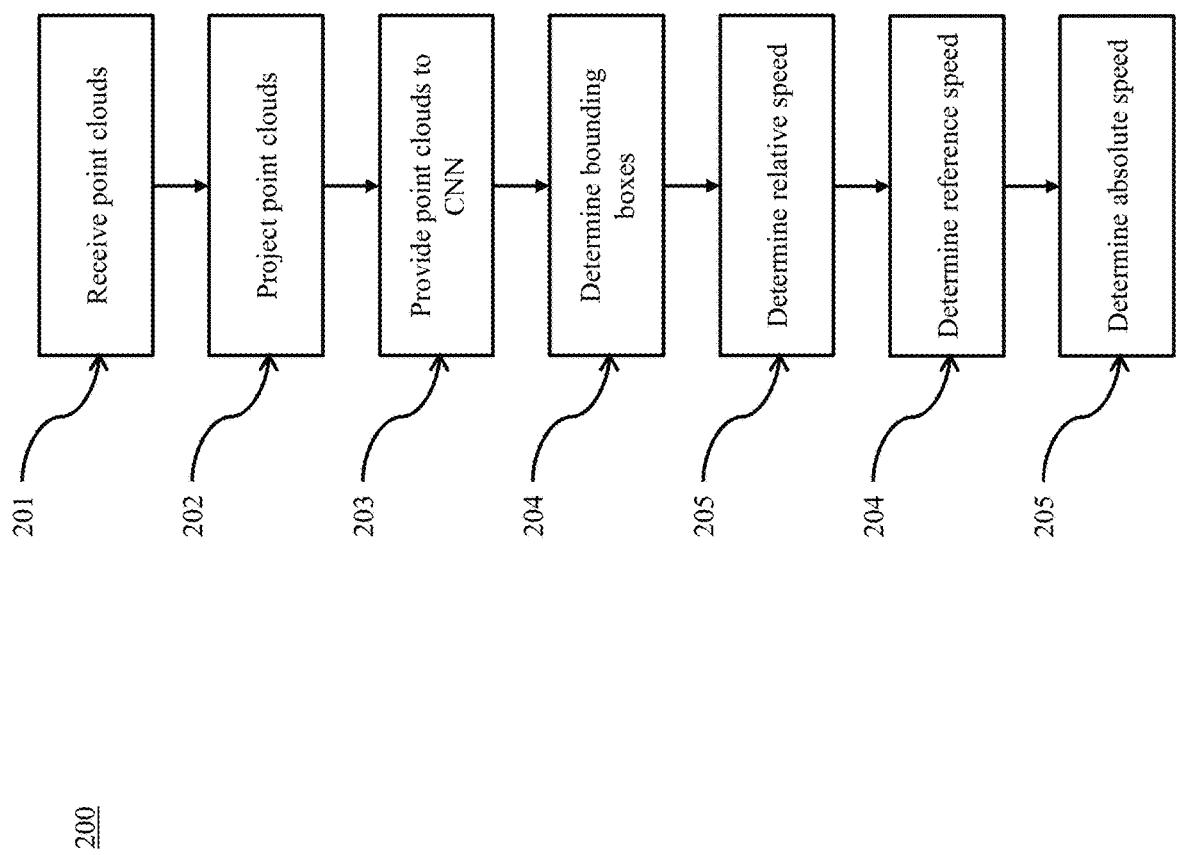
FIG. 2 illustrates a method of vehicle tracking according to embodiments of the present disclosure.

Referring now to FIG. 2 a method of vehicle tracking is illustrated according to embodiments of the present disclosure. At 201, a time-series of point clouds is received from a LiDAR sensor. At 202, each point cloud of the time series of point clouds is projected onto a plane. At 203, the projected point clouds are provided to a convolutional neural network. At 204, at least one bounding box of a vehicle within each of the projected point clouds is received from the convolutional neural network. At 205, a relative speed of the vehicle is determined from the bounding boxes with the projected point clouds. A reference speed of the LiDAR sensor is determined from the GPS receiver. From the relative speed and the reference speed, an absolute speed of the vehicle is determined.

Figure 3:
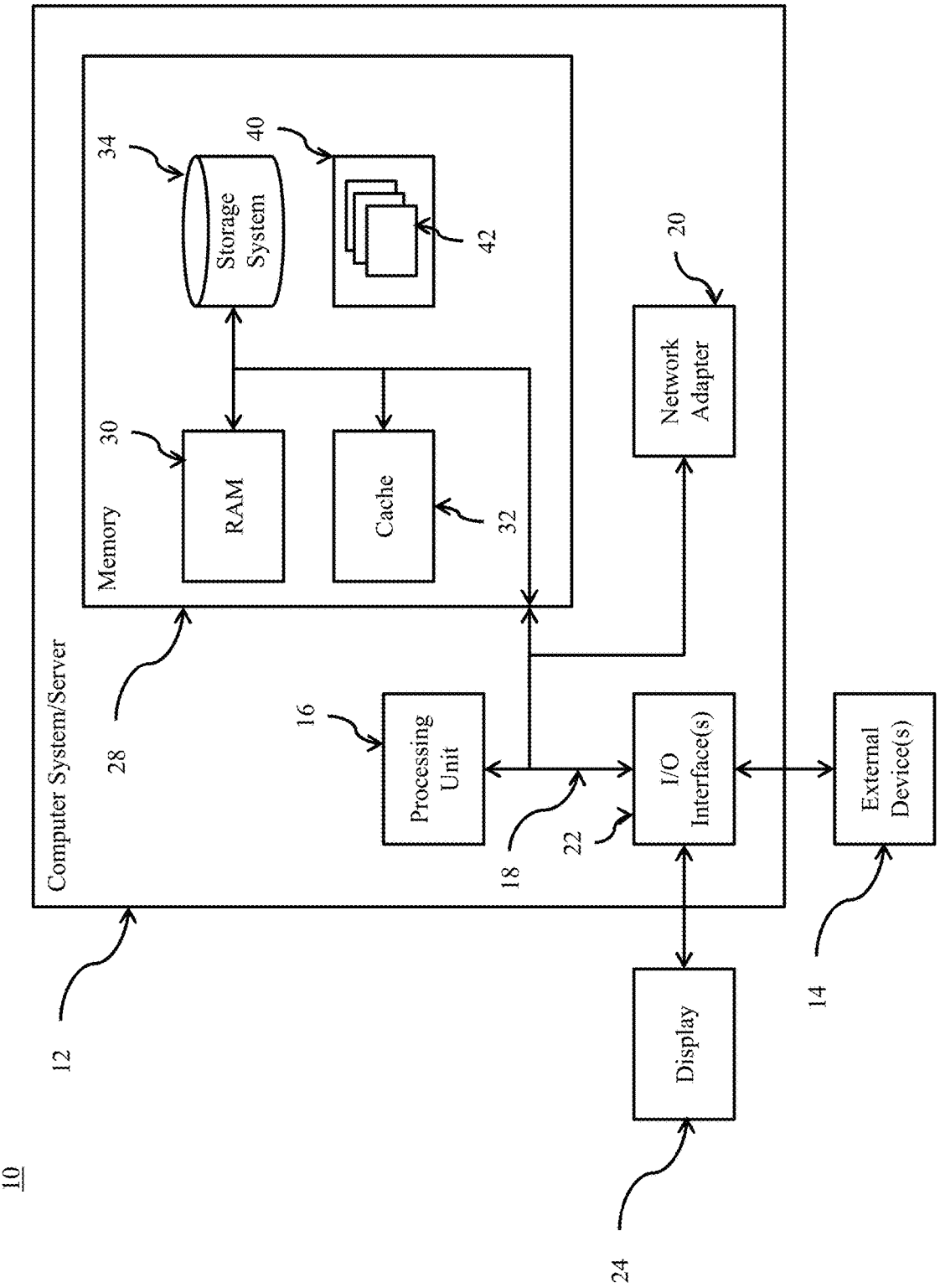
FIG. 3 depicts a computing node according to an embodiment of the present disclosure.

Referring now to FIG. 3, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a vehicle-mounted light detection and ranging (LiDAR) sensor;
a vehicle-mounted global positioning system (GPS) receiver;
a computing node operatively coupled to the LiDAR sensor and GPS receiver, the computing node comprising a computer readable storage medium having program instructions embodied therewith, the program instructions executable by a processor of the computing node to cause the processor to:
receive a time-series of point clouds from the LiDAR sensor;
project each point cloud of the time-series of point clouds onto a two-dimensional plane, the two-dimensional plane being a top-view plane;
provide the projected point clouds to a convolutional neural network;
receive from the convolutional neural network at least one bounding box of a vehicle within each of the projected point clouds, wherein receiving the at least one bounding box of the vehicle within each of the projected point clouds comprises:
determine a first bounding box in a first point cloud of the time-series of point clouds;
assign a vehicle identifier to the first bounding box, the vehicle identifier associated with the vehicle;
determine a second bounding box in a second point cloud that intersects the first bounding box in the first point cloud, the second point cloud being immediately after the first point cloud in the time series of point clouds; and
assign the vehicle identifier to the second bounding box;
determine from the received at least one bounding box a relative speed of the vehicle;
determine from the GPS receiver a reference speed of the LiDAR sensor; and
from the relative speed and the reference speed, determine an absolute speed of the vehicle.

2. The system of claim 1, wherein the program instructions executable by the processor of the computing node further cause the processor to:
determining a distance of the vehicle;
comparing the distance of the vehicle to a predetermined distance; and
when the distance is less than the predetermined distance, providing an indication that the vehicle is tailgating.

3. A method comprising:
receiving a time-series of point clouds from a light detection and ranging (LiDAR) sensor;
projecting each point cloud of the time series of point clouds onto a two-dimensional plane, the two-dimensional plane being a top-view plane;
providing the projected point clouds to a convolutional neural network;
receiving from the convolutional neural network at least one bounding box of a vehicle within each of the projected point clouds, wherein receiving the at least one bounding box of the vehicle within each of the projected point clouds comprises:
determining a first bounding box in a first point cloud of the time-series of point clouds;
assigning a vehicle identifier to the first bounding box, the vehicle identifier associated with the vehicle;
determining a second bounding box in a second point cloud that intersects the first bounding box in the first point cloud, the second point cloud being immediately after the first point cloud in the time series of point clouds; and
assigning the vehicle identifier to the second bounding box;
determining from the received at least one bounding box a relative speed of the vehicle;
determining from a global positioning system (GPS) receiver a reference speed of the LiDAR sensor; and
from the relative speed and the reference speed, determining an absolute speed of the vehicle.

4. The method of claim 3, further comprising:
determining a distance of the vehicle;
comparing the distance of the vehicle to a predetermined distance; and
when the distance is less than the predetermined distance, providing an indication that the vehicle is tailgating.

\* \* \* \* \*